(12) United States Patent
Cheng

(10) Patent No.: US 8,081,828 B2
(45) Date of Patent: Dec. 20, 2011

(54) METHOD FOR TRANSMITTING IMAGE BIT STREAM AND IMAGE ENCODER

(75) Inventor: Shih-Yang Cheng, Taichung County (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 952 days.

(21) Appl. No.: 12/073,944

(22) Filed: Mar. 12, 2008

(65) Prior Publication Data
US 2009/0148053 A1 Jun. 11, 2009

(30) Foreign Application Priority Data
Dec. 5, 2007 (TW) .............................. 96146228 A

(51) Int. Cl.
*G06K 9/36* (2006.01)
(52) U.S. Cl. ....................................................... 382/232
(58) Field of Classification Search .......... 382/382–253, 382/166, 284; 375/240.01–240.29; 341/65, 341/60, 67; 348/222.1, 221.1
See application file for complete search history.

(56) References Cited

U.S. PATENT DOCUMENTS

| | | | | |
|---|---|---|---|---|
| 5,818,364 A | * | 10/1998 | Hintzman et al. | 341/65 |
| 6,167,153 A | * | 12/2000 | de Queiroz | 382/166 |
| 7,027,665 B1 | * | 4/2006 | Kagle et al. | 382/284 |
| 7,719,574 B2 | * | 5/2010 | Nakami et al. | 348/221.1 |

\* cited by examiner

*Primary Examiner* — Ishrat I Sherali
(74) *Attorney, Agent, or Firm* — Thomas|Kayden

(57) ABSTRACT

The invention discloses a method for transmitting image bit stream and an image encoder utilizing the method. The image format comprises a start of image (SOI) marker, a start of scan (SOS) marker and a primary compressed data. First, the invention generates redundant data according to a first start address of the SOI marker, a data size between the SOI marker and the SOS marker, and a second start address of the primary compressed data. Afterward, the redundant data is selectively padded into the image bit stream between the SOI marker and the SOS marker. Accordingly, the required time for transmitting image data to a storage medium will be reduced, and the transmission performance will be improved apparently by utilizing the method.

8 Claims, 8 Drawing Sheets

Generate redundant data according to a first start address of the SOI marker, a data size between the SOI marker and the SOS marker, and a second start address of the primary compressed data. — S30

Selectively pad the redundant data into the image bit stream between the SOI marker and the SOS marker. — S32

METHOD FOR TRANSMITTING IMAGE BIT STREAM AND IMAGE ENCODER

BACKGROUND OF THE INVENTION

1. Field of the Invention

The invention relates to a method for transmitting image bit stream and an image encoder and, more particularly, to a method for improving the transmission performance of image bit stream.

2. Description of the Prior Art

For image capturing products, such as digital cameras, mobile phones and so on, Joint Photographic Experts Group (JPEG) is one kind of image formats in common at present. With the promotion of image resolution and image quality, the size of JPEG bit stream is increased accordingly. Because the size increases, much time is required for transmitting the bit stream from memory to a storage device. For this reason, how to improve storing performance and transmitting rate of JPEG bit stream for users becomes a significant mission.

Please refer to FIG. 1. FIG. 1 is a schematic diagram illustrating an image capturing system 1 of the prior art. As shown in FIG. 1, the image capturing system 1 comprises a sensor 10, an image signal processor 11, a JPEG encoder 12, a bus 14, a memory 16 and a non-volatile storage 18. The sensor 10 is used for capturing an image. The image signal processor (ISP) 11 is used for processing the captured image and then transmitting the captured image to the JPEG encoder 12. Afterward, the JPEG encoder 12 compresses the captured image into image bit stream and then transmits the image bit stream to the memory 16 through the bus 14. The image bit stream stored in the memory 16 also can be written into the non-volatile storage 18 via the bus 14.

In the prior art, many methods can be adopted for improving the transmitting performance of the JPEG bit stream; one is to utilize a pipeline for compressing JPEG image into image bit stream and transmitting the image bit stream, to further increase the storing performance of the JPEG bit stream, as disclosed in U.S. Pat. No. 7,027,665. In this method, a controller of a storage device can store the bit stream while a JPEG codec compresses the image. The method utilizes the pipeline built between a codec and a storage device for reducing the required time of capturing image. By utilizing the pipeline, image procession and compression are unnecessary to be fully completed while a user is browsing an image. Besides, another method is to utilize a more effective bus and controller of a storage device for promoting the storing performance between memory and storage devices.

Furthermore, another method is disclosed in U.S. Pat. No. 6,167,153. In this method, although the method is used for increasing the JPEG compression rate, the real bottleneck is the transmitting performance of image bit stream between the memory and the storage device because of storing characteristic of memory. Some image device utilizes lots of memory buffer attached to the compressed image for promoting the storing performance, but the memory will be spent easily after capturing several frames. Accordingly, if the transmitting rate of the image data can be increased, the performance of the image capturing system can be promoted apparently.

Accordingly, the main scope of the invention is to provide a method for transmitting image bit stream and an image encoder to solve the aforesaid problems.

SUMMARY OF THE INVENTION

A scope of the invention is to provide a method for transmitting image bit stream and an image encoder; that is, the invention pads redundant data into an image format to improve the transmission efficiency of image bit stream.

According to an embodiment of the invention, the image bit stream comprises a start of image (SOI) marker, a start of scan (SOS) marker and a primary compressed data. In this embodiment, the invention generates redundant data according to a first start address of the SOI marker, a data size between the SOI marker and the SOS marker, and a second start address of the primary compressed data. Afterward, the redundant data is selectively padded into the image bit stream between the SOI marker and the SOS marker. Accordingly, the image bit stream will be transmitted under bit alignment, and the required time for transmitting image data from a memory to a storage medium will be reduced, and further the transmission performance will be improved apparently by utilizing this method.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
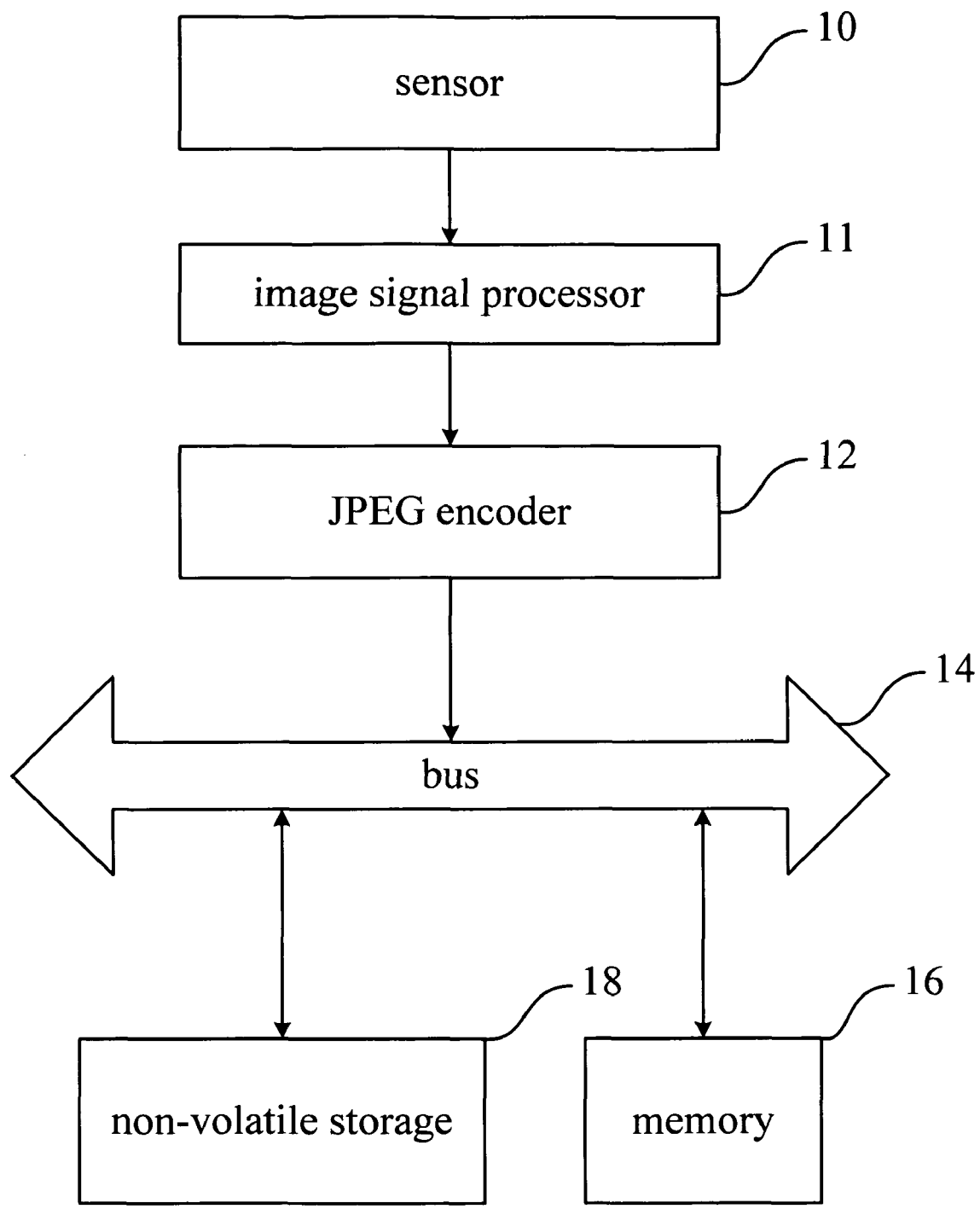
FIG. 1 is a schematic diagram illustrating an image capturing system of the prior art.
Figure 2:
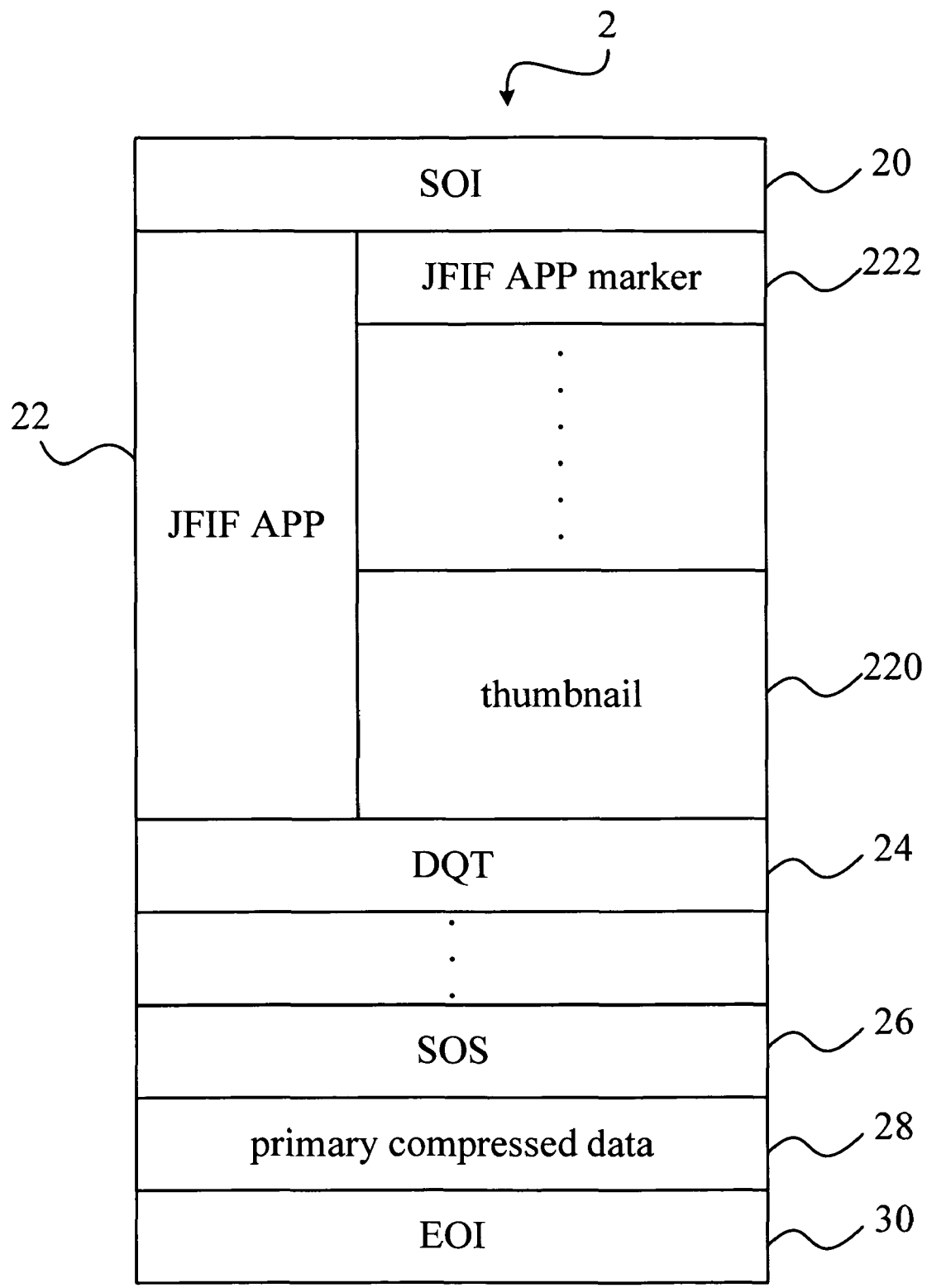
FIG. 2 is a schematic diagram illustrating an image conformed to JPEG format.

Please refer to FIG. 2. FIG. 2 is a schematic diagram illustrating an image bit stream 2 conformed to JPEG format. The method for transmitting image bit stream of the invention is used for increasing transmission performance of an image bit stream. The image bit stream can be conformed to JPEG format or the like. The following is to describe the feature techniques of the invention by utilizing an image bit stream conformed to JPEG format. As shown in FIG. 2, the image bit stream 2 conformed to JPEG format comprises a start of image (SOI) 20 marker, a JPEG file interchange format (JFIF) reserved for application use (APP) 22, a define quantization table (DQT) 24, a start of scan (SOS) 26 marker, a primary compressed data 28 and a end of image (EOI) 30 marker. The JFIF APP 22 can further comprise a thumbnail 220 and a JFIF APP marker 222.

Figure 3:
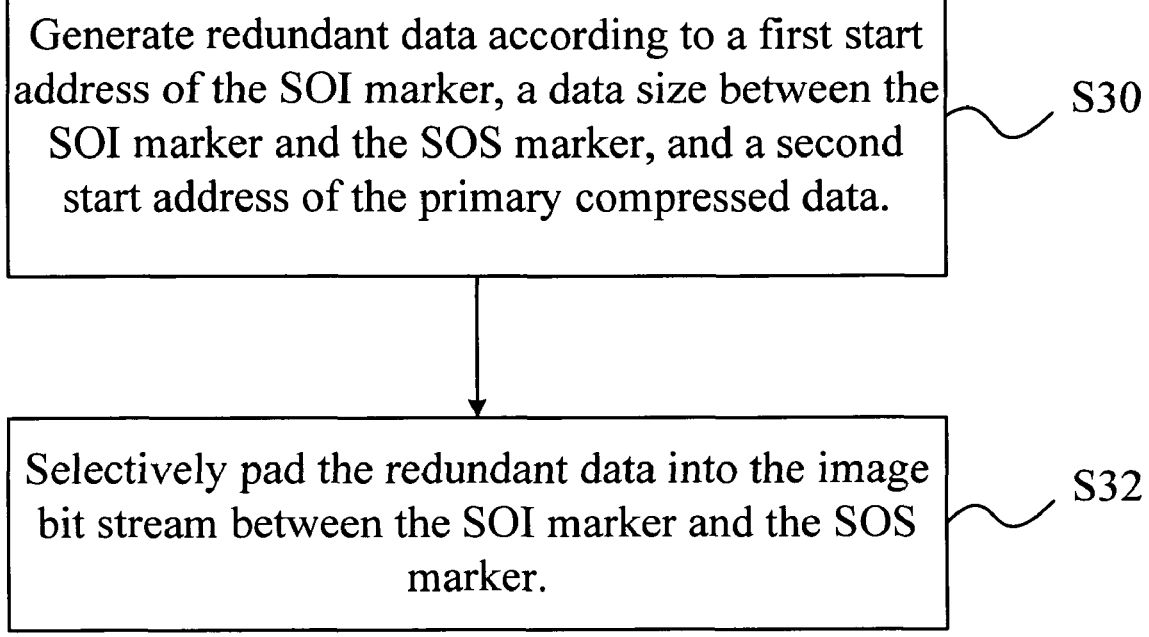
FIG. 3 is a flow chart illustrating a method for transmitting image bit stream according to an embodiment of the invention.
Figure 4:
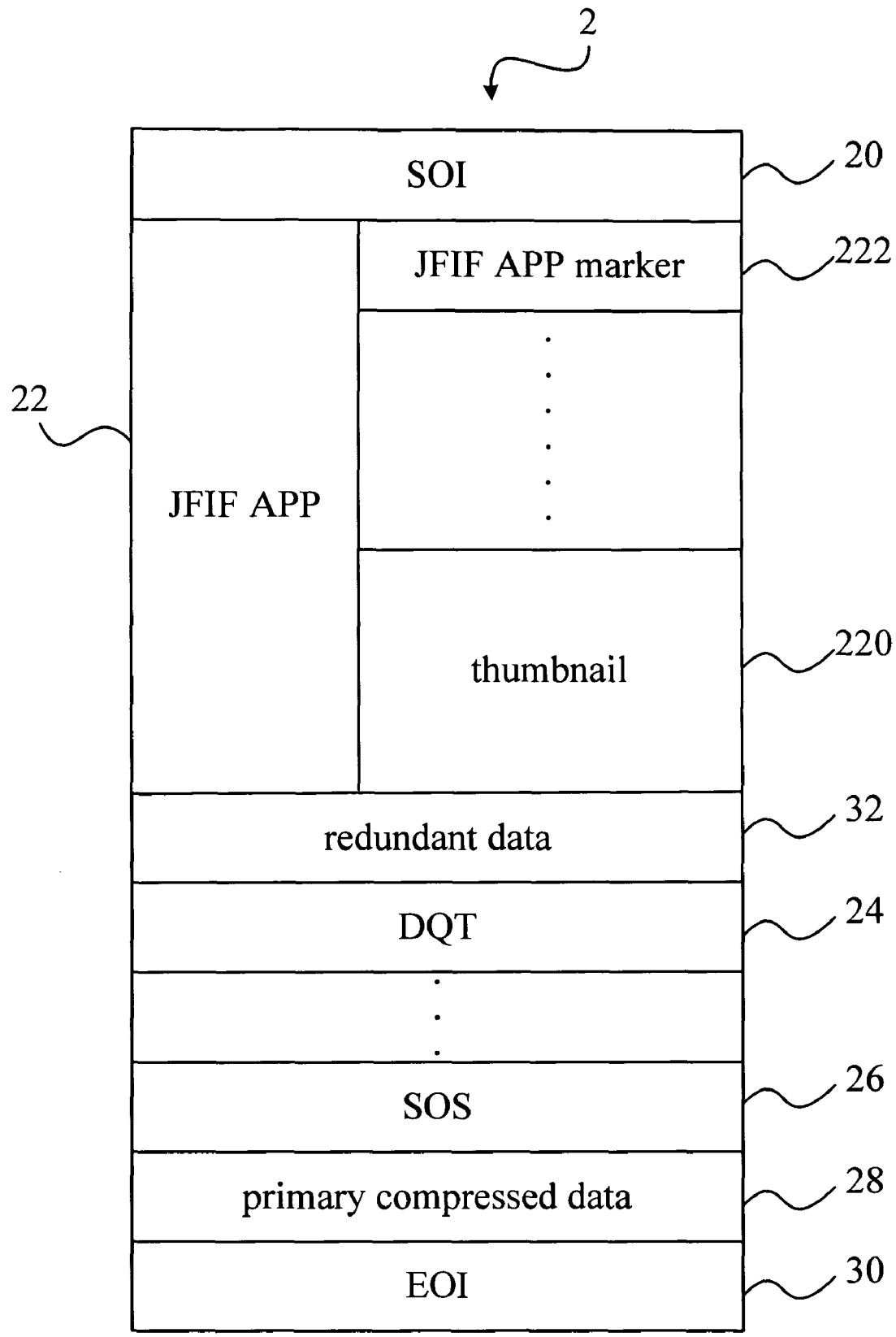
FIG. 4 is a schematic diagram illustrating an image bit stream padded with redundant data.

Please refer to FIG. 3 and FIG. 4. FIG. 3 is a flow chart illustrating a method for transmitting image bit stream according to an embodiment of the invention. FIG. 4 is a schematic diagram illustrating an image bit stream padded with redundant data 32. In this embodiment, first of all, step S30 is performed to generate redundant data 32 (as shown in FIG. 4) according to a first start address of the SOI 20 marker, a data size between the SOI 20 marker and the SOS 26 marker, and a second start address of the primary compressed data 28.

It should be noted that the redundant data 32 mentioned in the step S30 can be obtained from the formula listed as follows:

$$K = LCM(M, N) - (P+S) \% LCM(M, N).$$  Formula One wherein the second start address of the primary compressed data 28 is a multiple of M bits, the data size between the SOI 20 marker and the SOS 26 marker is a multiple of N bits, both N and M are positive integers, and LCM(M, N) represents a lowest common multiple of M and N. P represents the first start address of the SOI 20 marker, S represents the data size between the SOI 20 marker and the SOS 26 marker, and K represents a data size of the redundant data 32.

After the redundant data 32 is obtained from step S30, step S32 is then performed to selectively pad the redundant data 32 between the SOI 20 marker and the SOS 26 marker. As shown in FIG. 4, the redundant data 32 is padded between the JFIF APP 22 and DQT 24. It should be noticed that the redundant data 32 can be padded between two random markers between the SOI 20 marker and the SOS 26 marker under a condition of satisfying the image format.

Because the redundant data 32 is generated according to the first start address of the SOI 20 marker, the data size between the SOI 20 marker and the SOS 26 marker, and the second start address of the primary compressed data 28. The image bit stream can be transmitted under bit alignment after the redundant data 32 is padded into the image bit stream.

Figure 5:
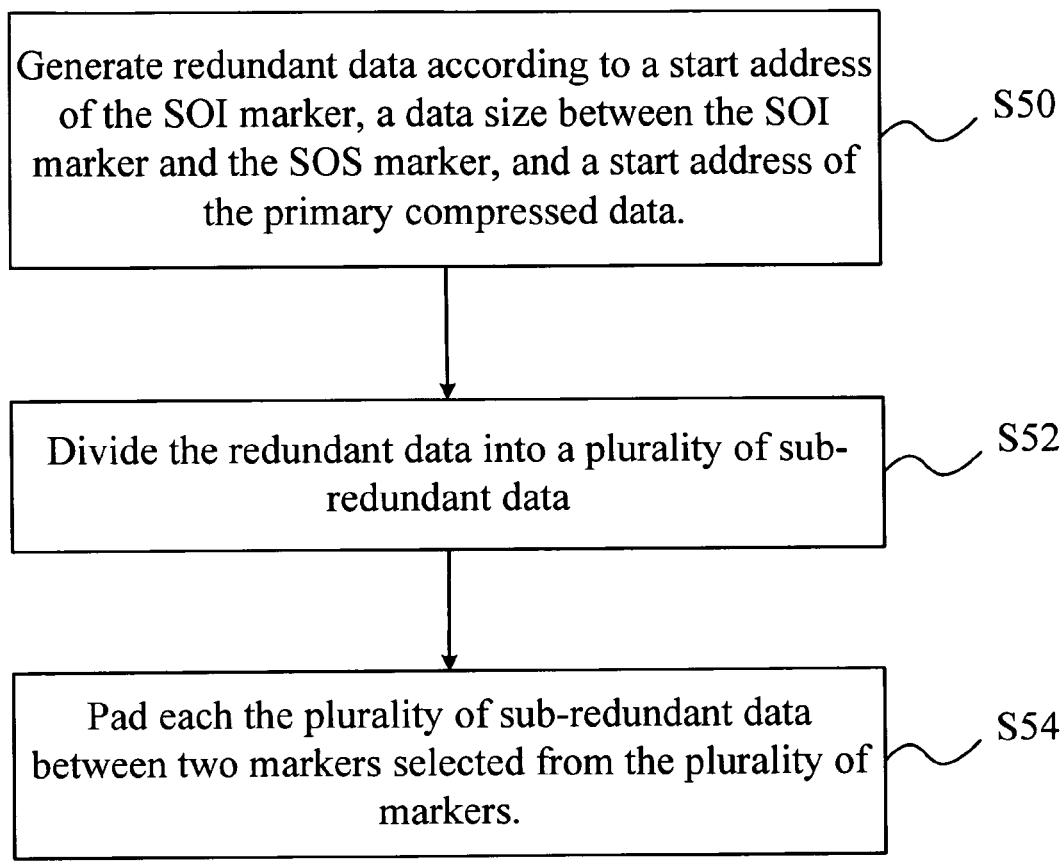
FIG. 5 is a flow chart illustrating a method for transmitting image bit stream according to another embodiment of the invention.
Figure 6:
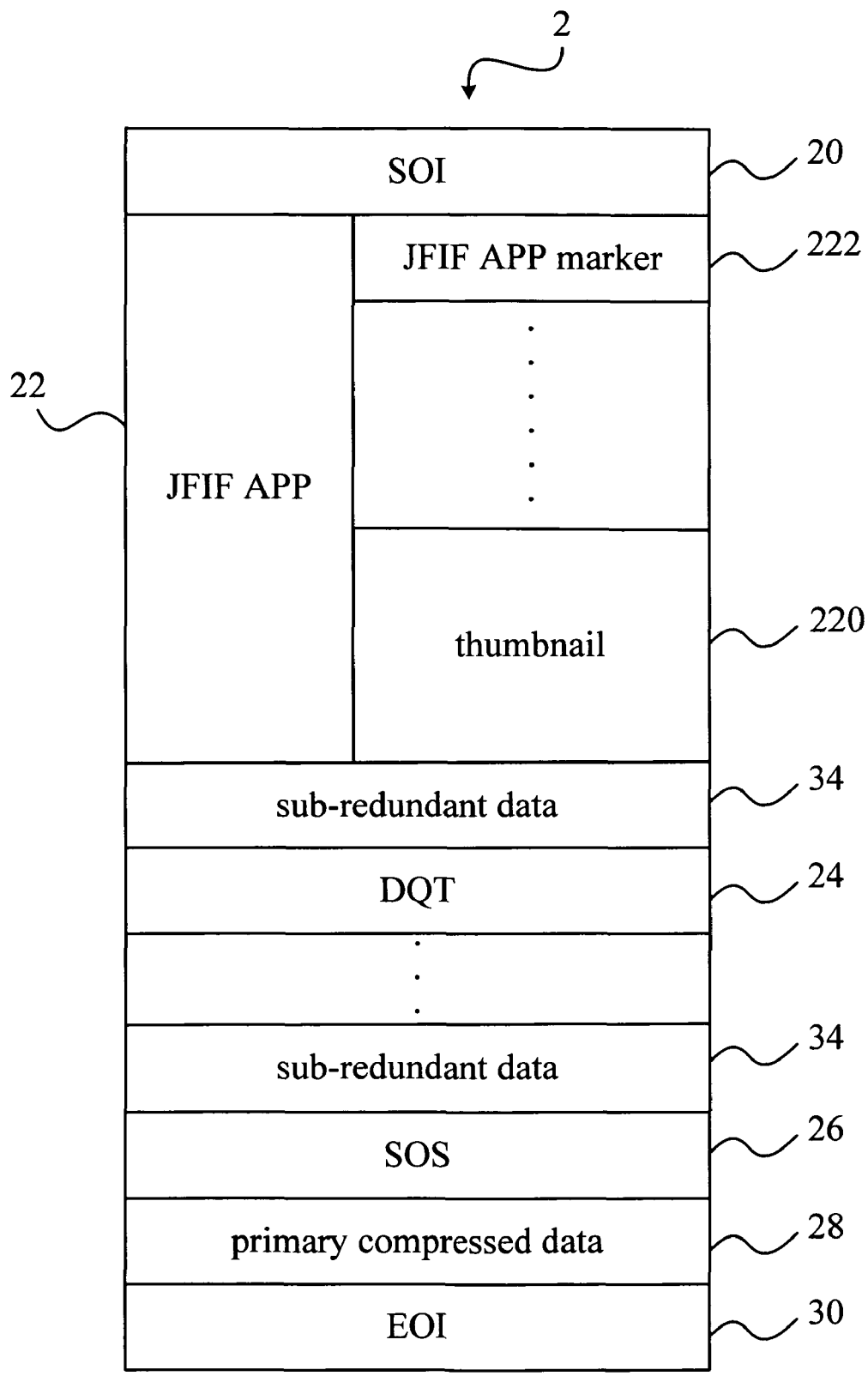
FIG. 6 is a schematic diagram illustrating an image bit stream padded with sub-redundant data.

Please refer to FIG. 5 and FIG. 6. FIG. 5 is a flow chart illustrating a method for transmitting image bit stream according to another embodiment of the invention. FIG. 6 is a schematic diagram illustrating an image bit stream padded with sub-redundant data 34. As mentioned above, in addition to the SOI 20 marker and the SOS 26 marker, the JPEG image bit stream 2 further comprises a plurality of markers, such as the JFIF APP 22, the DQT 24, the thumbnail 220 and the JFIF APP marker 222. In this embodiment, first of all, step S50 is performed to generate redundant data according to a first start address of the SOI 20 marker, a data size between the SOI 20 marker and the SOS 26 marker, and a second start address of the primary compressed data 28. Afterward, step S52 is then performed to divide the redundant data into a plurality of sub-redundant data 34 (as shown in FIG. 6). Finally, step S54 is then performed to pad each of the sub-redundant data between two markers selected from the plurality of markers between the SOI 20 marker and the SOS 26 marker.

As shown in FIG. 6, one sub-redundant data 34 is padded between the JFIF APP 22 and the DQT 24, the other is padded between the DQT 24 and the SOS 26 marker. It should be noticed that the plurality of sub-redundant data 34 also can be padded between random two markers between the SOI 20 marker and the SOS 26 marker under a condition of satisfying the image format.

Figure 7:
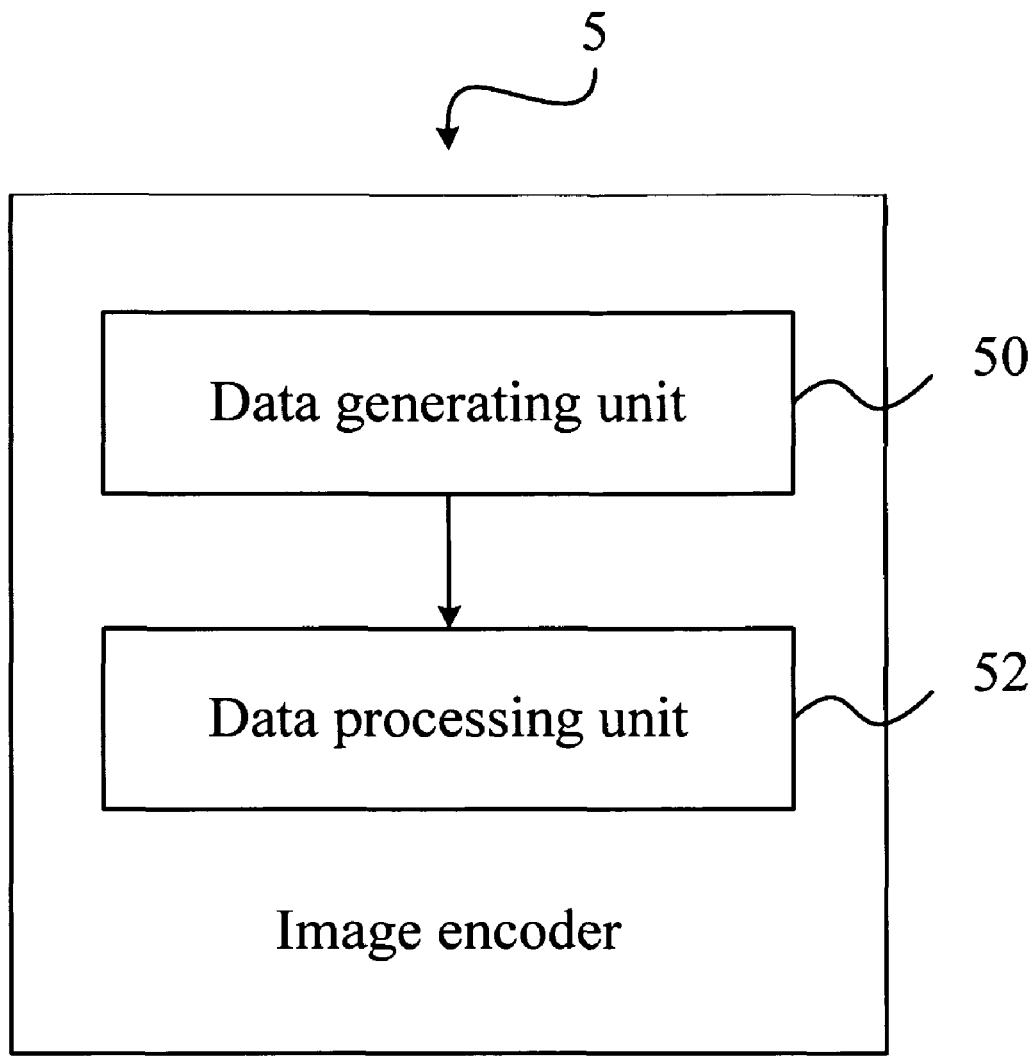
FIG. 7 is a schematic diagram illustrating an image encoder according to an embodiment of the invention.

Please refer to FIG. 7. FIG. 7 is a schematic diagram illustrating an image encoder 5 according to an embodiment of the invention. As shown in FIG. 7, the image encoder 5 comprises a data generating unit 50 and a data processing unit 52. The data generating unit 50 is used for generating a redundant data 32 according to a first start address of the SOI 20 marker, a data size between the SOI 20 marker and the SOS 26 marker, and a second start address of the primary compressed data 28. The data processing unit 52 is used for selectively padding the redundant data 32 between the SOI 20 marker and the SOS 26 marker. The behavioral principle of the data generating unit 50 shown in FIG. 7 is the same as step S30 mentioned in FIG. 3 and not mentioned again here.

Figure 8:
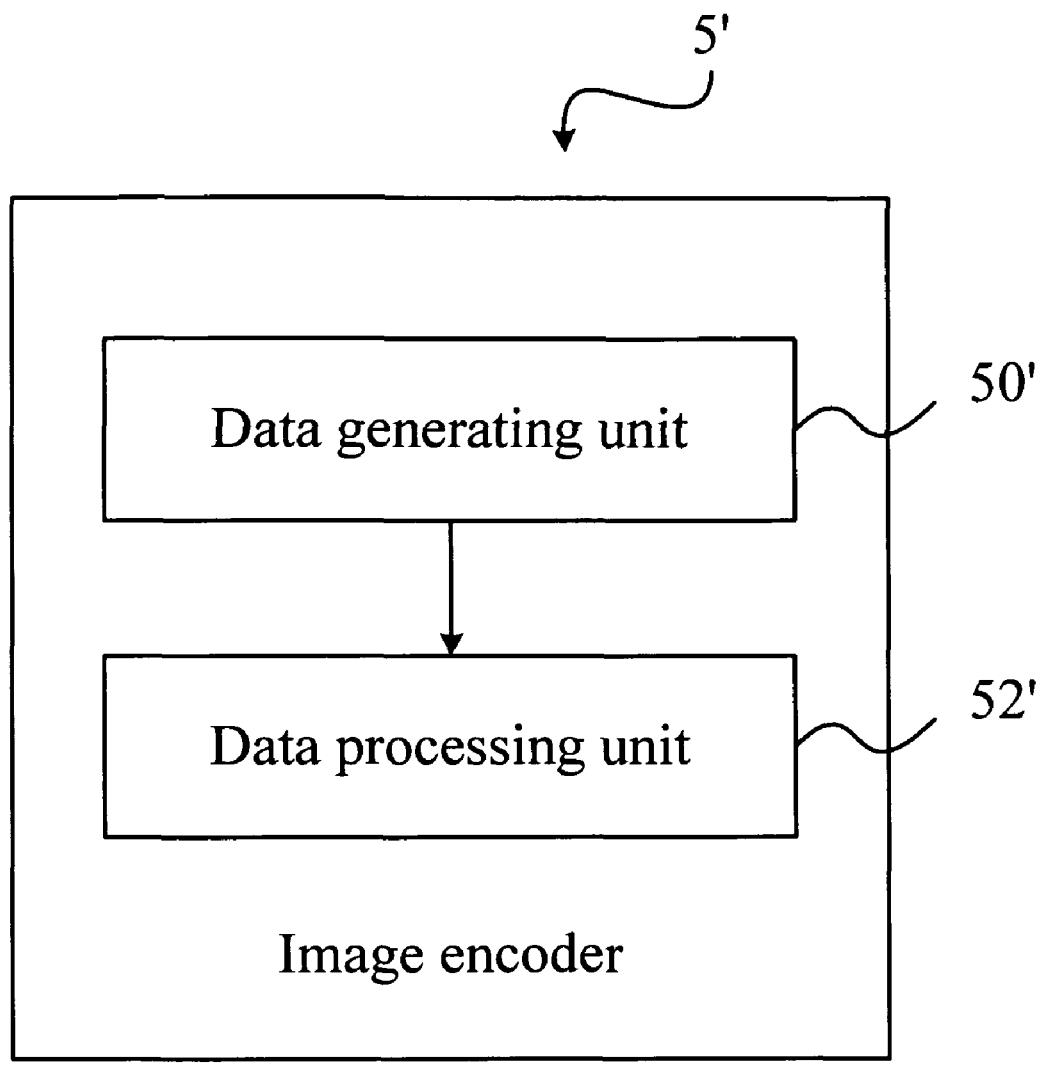
FIG. 8 is a schematic diagram illustrating an image encoder according to another embodiment of the invention.

Please refer to FIG. 8. FIG. 8 is a schematic diagram illustrating an image encoder 5' according to another embodiment of the invention. As shown in FIG. 8, the main difference between the image encoder 5 and the image encoder 5' is that the data generating unit 50' further divides the redundant data 32 into a plurality of sub-redundant data 34, and the data processing unit 52' pads each of the sub-redundant data between two markers selected from the plurality of markers between the SOI 20 marker and the SOS 26 marker. The aforesaid plurality of markers are shown in FIG. 2 and not mentioned again here.

Because the redundant data 32 is generated based on the aforesaid image encoders 5 or 5', the image bit stream can be transmitted under bit alignment after the redundant data 32 is padded into the image bit stream.

In order to illustrate this invention in detail, an experimental example is provided as follows.

First of all, assume that a first start address P of the SOI marker is 0x24001000, a data size S between the SOI marker and the SOS marker is 0x002B0123, a second start address of the primary compressed data is a multiple of 16 bits (namely M=16), and the data size between the SOI marker and the SOS marker is a multiple of 32 bits (namely N=32); namely, LCM(M, N) is 32 bits. By utilizing the aforesaid Formula One, the redundant data 32 can be obtained from K=LCM(M, N)−(P+S) % LCM(M,N)=32−(0x24001000+0x002B1023) % 32=32−3=29 bits. That is, the required size of the redundant data 32 is 29 bits.

The followings are several experimental results relative to the required time in different resolutions when an image is captured by a sensor and transmitted to a non-volatile storage and, more particularly, to the reduced time when the image is transmitted to the non-volatile storage, wherein the aforesaid non-volatile storage is a secure digital card (SD card) with 1 MB/sec storing performance, and the capturing performance of the sensor is 4 fps. The experimental results are executed by using 5 Mb (2592×1944), 4 Mb (2272×1704), 3 Mb (2048×1536), 2 Mb (1600×1200) and 1.3 Mb (1280×960) respectively and shown in table 1.

TABLE 1

|  | Image resolution | | | | |
|---|---|---|---|---|---|
|  | 5 M | 4 M | 3 M | 2 M | 1.3 M |
| Sensor Capturing image | 0.25 Sec (4 fps) | | | | |
| Image signal processor Processing procedure | 0.84 Sec | | | | |
| JPEG compressing Procedure | 0.230 Sec | 0.176 Sec | 0.138 Sec | 0.088 Sec | 0.057 Sec |
| Storing procedure (1 Mb/sec) (SD card) | 2 M (2 Sec) | 1.53 M (1.53 Sec) | 1.25 M (1.25 Sec) | 0.77 M (0.77 Sec) | 0.49 M (0.49 Sec) |

TABLE 1-continued

| | Image resolution | | | | |
|---|---|---|---|---|---|
| | 5 M | 4 M | 3 M | 2 M | 1.3 M |
| Storing procedure (1 Mb/sec) (Apply the invention) | 1.08 Sec | 0.87 Sec | 0.73 Sec | 0.48 Sec | 0.34 Sec |
| Total required time (Not apply the invention) | 3.32 Sec | 2.78 Sec | 2.50 Sec | 1.95 Sec | 1.64 Sec |
| Total required time (Apply the invention) | 2.40 Sec | 2.12 Sec | 1.98 Sec | 1.66 Sec | 1.49 Sec |

Compared with prior art, because the redundant data is generated according to a first start address of the SOI marker, a data size between the SOI marker and the SOS marker, and a second start address of the primary compressed data, the image bit stream can be transmitted under bit alignment after the redundant data is padded into the image bit stream. By utilizing the invention, the required time for transmitting image data to a storage medium will be reduced, and the capturing performance will be improved apparently.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for improving the transmission performance of an image, the image comprising a start of image (SOI) marker, a start of scan (SOS) marker and a primary compressed data, the method comprising steps of:
    (a) generating a redundant data according to a first start address of the SOI marker, a data size between the SOI marker and the SOS marker, and a second start address of the primary compressed data; and
    (b) selectively padding the redundant data between the SOI marker and the SOS marker.

2. The method of claim 1, wherein the image complies with JPEG format.

3. The method of claim 1, wherein the redundant data is calculated by:

$$K=LCM(M, N)-(P+S)\%LCM(M, N);$$

wherein the second start address of the primary compressed data is a multiple of M bits, the data size between the SOI marker and the SOS marker is a multiple of N bits, both N and M are positive integers, LCM(M, N) represents a lowest common multiple of M and N, P represents the first start address of the SOI marker, S represents the data size between the SOI marker and the SOS marker, and K represents a data size of the redundant data.

4. The method of claim 1, wherein the image further comprises a plurality of markers between the SOI marker and the SOS marker, and step (b) comprises steps of:
    dividing the redundant data into a plurality of sub-redundant data; and
    padding each of the sub-redundant data between two markers selected from the plurality of markers.

5. An image encoder for encoding an image, the image comprising a start of image (SOI) marker, a start of scan (SOS) marker and a primary compressed data, the image encoder comprising:
    a data generating unit for generating a redundant data according to a first start address of the SOI marker, a data size between the SOI marker and the SOS marker, and a second start address of the primary compressed data; and
    a data processing unit for selectively padding the redundant data between the SOI marker and the SOS marker.

6. The image encoder of claim 5, wherein the image complies with JPEG format.

7. The image encoder of claim 5, wherein the redundant data is calculated by:

$$K=LCM(M, N)-(P+S)\%LCM(M, N);$$

wherein the second start address of the primary compressed data is a multiple of M bits, the data size between the SOI marker and the SOS marker is a multiple of N bits, both N and M are positive integers, LCM(M, N) represents a lowest common multiple of M and N, P represents the first start address of the SOI marker, S represents the data size between the SOI marker and the SOS marker, and K represents a data size of the redundant data.

8. The image encoder of claim 5, wherein the image further comprises a plurality of markers between the SOI marker and the SOS marker, the data generating unit further divides the redundant data into a plurality of sub-redundant data, and the data processing unit pads each of the sub-redundant data between two markers selected from the plurality of markers.

* * * * *